UNITED STATES PATENT OFFICE.

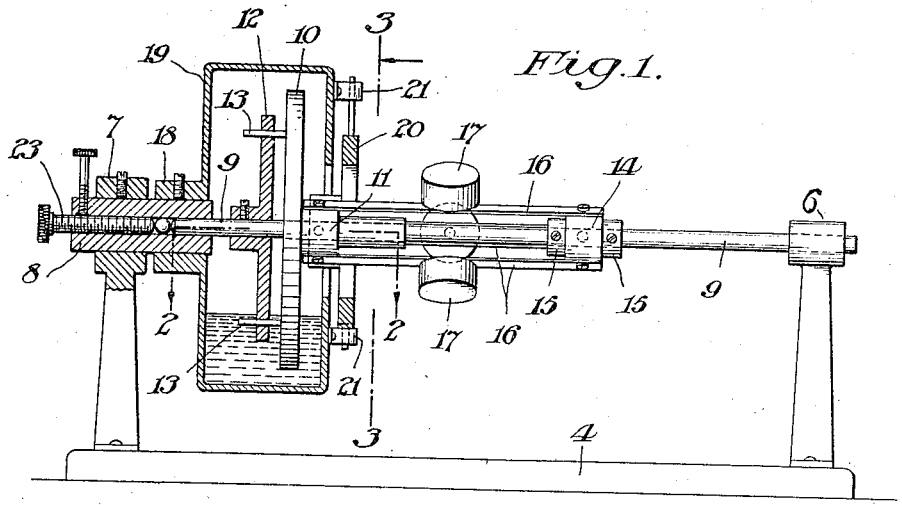

ROBERT F. COLEMAN, OF PHILADELPHIA, PENNSYLVANIA, ASSIGNOR OF ONE-HALF TO GUSTAVE LYON, OF PHILADELPHIA, PENNSYLVANIA.

MOTOR-GOVERNOR.

1,263,378.

Specification of Letters Patent. Patented Apr. 23, 1918.

Application filed May 4, 1916. Serial No. 95,390.

*To all whom it may concern:*

Be it known that I, ROBERT F. COLEMAN, a citizen of the United States, residing at Philadelphia, in the county of Philadelphia and State of Pennsylvania, have invented certain new and useful Improvements in Motor-Governors, of which the following is a specification.

My invention relates to improvements in speed governors employing a spring operated friction disk, for small motors such as used in talking machines and music boxes. The object of my invention is to provide a governor of novel, simple and efficient construction having provision: first, whereby the tendency to twist the springs around the shaft is lessened or practically obviated; secondly, whereby the friction between certain moving parts of the governor is lessened; thirdly, whereby the shattering or trembling of the shaft is obviated; fourthly, whereby oil may be supplied to the working parts; fifthly, whereby the springs are connected directly to a part of the friction disk without operating as part of the means for actuating the disk by the motor shaft; and, sixthly, whereby various novel and advantageous results are attained. With this object in view, my invention consists in the novel construction and combinations of parts hereinafter fully described and claimed.

In the accompanying drawings, illustrating my invention:

Figure 1 is a longitudinal section, showing one form of embodiment of my invention.

Fig. 2 is a transverse section, on line 2—2 of Fig. 1.

Fig. 3 is a transverse section, on line 3—3 of Fig. 1.

Fig. 4 is a longitudinal section, showing another form of embodiment of my invention.

Fig. 5 is a transverse section, on line 5—5 of Fig. 4.

Referring first to Figs. 1, 2 and 3 of the drawings, 4 designates a suitable frame which includes two bearings 6 and 7. Secured within the bearing 7 is a supporting sleeve 8 which is set in axial alinement with the bearing 6; and mounted to rotate freely in the bearing 6 and sleeve 8 and also to move longitudinally therein is a shaft 9 which may be driven by any suitable motor, and the speed of which is governed by my improved mechanism, as will be hereinafter described.

Surrounding the motor shaft 9 is a friction disk 10 having a hub or collar 11 which is mounted to turn freely on the shaft 9 and to slide longitudinally thereon. Secured on the shaft 9 adjacent to the disk 10 is a driving disk or member 12; and projecting fixedly from the friction disk 10 parallel to the shaft 9 are pins 13 which are slidably fitted within openings in the driving member 12, whereby, when the shaft 9 is rotated, the engagement of the driving member 12 with the pins 13 will cause the rotation of the friction disk 10, and the friction disk will be free to move longitudinally of the shaft 9. Mounted to rotate freely upon the shaft 9 in spaced relation to the collar 11 of the disk 10 is a collar 14 which is prevented from moving longitudinally of the shaft 9 by collars 15 secured on the shaft 9 on the respective sides of the collar 14. The collar 11 of the disk 10 is connected to the collar 14 by springs 16, the respective ends of which are secured to the collars 11 and 14. The springs 16 are provided with weights 17 which are secured thereto intermediate of their ends. When the shaft 9 and therewith the friction disk 10 are rotated, as previously explained, the disk 10 will rotate the springs 16 and the collar 14, for a purpose hereinafter explained.

Surrounding the sleeve 8 and secured thereto by a suitable set screw is a collar 18 carrying a casing 19 which incloses the friction disk 10 and the driving member 12, as shown. The casing 19 carries a friction member 20 which, as herein shown, is made in the form of a ring surrounding the shaft 9 and springs 16 and having opposite trunnions which are fitted in bearings 21 on the casing 19 to pivotally connect the member 20 to the casing. The member 21 is provided with two friction shoes 22 which are formed of suitable material and project into the casing 19 to be engaged by the friction disk 10. The purpose of pivoting the member 20 to the casing is to make the shoes automatically adjustable to bear against the disk 10 with the same pressure when the disk is moved against the shoes.

To adjust the shaft 9 and friction disk 10 longitudinally to vary the relation of the disk 10 and shoes 22, I provide a screw 23 which is screwed into the outer end of the sleeve 8 and engages a ball 24 which in turn engages the end of the shaft 9, the ball 24 being interposed within the sleeve 8 between the screw 23 and the shaft 9. By adjusting the screw 23 inwardly, the shaft 9 and therewith the disk 10 may be adjusted toward the shoes 22 of the member 20, and by adjusting the shaft 9 may be permitted to move in the reverse direction.

Briefly described, the operation of the parts thus far referred to is as follows: As the motor driven shaft 9 attempts to speed up beyond the desired limit, the weights 17, by centrifugal action, will draw the central portions of the springs 16 outwardly and thereby force the friction disk against the friction shoes 22 of the member 20 and thereby control the speed of the shaft 9 and the motor driving it. During this operation, the driving member 12, engaging the pins 13 causes the rotation of the friction disk 10 without producing any substantial twisting action in the springs 16; and the collar 14 being free to rotate on the shaft 9, prevents any lost motion between the member 12 and pins 13 from producing any twisting action in the springs 16. As the centrifugal action of the weights 17 presses the disk 10 against the shoes 22 it also tends to press the shaft 9 against the ball 24; and, therefore, by adjusting the screw 23 the degree of pressure of the disk 10 against the shoes 22 and consequently the speed of the shaft 9 and the motor driving it may be nicely regulated. The lower portion of the casing 19 is adapted to contain a suitable quantity of oil through which the disk 10, its pins 13 and the driving member 12 pass for the lubrication thereof.

Referring now to Figs. 4 and 5, the shaft 9, the friction disk 10 and its operating devices are the same as shown in Figs. 1, 2 and 3, and described with reference thereto, excepting that the shaft 9 extends through and is rotatable in a bearing 26 on a frame 27 and is provided with collars 28 which prevent longitudinal movement of the shaft. In this construction I provide a screw-threaded shaft 29 which extends parallel to the shaft 9 and is mounted to turn in suitable bearings 30 and 31 on the frame 27. The outer end of the shaft 29 is provided with a head 32 by means of which the shaft 29 may be turned and longitudinal movement of the shaft 29 is prevented by the head 32 and a collar 32ª on the shaft engaging the respective faces of the bearing 30. The shaft 29 carries a block 33 which is engaged by the threads on the shaft 29 to be moved thereby when the shaft is turned and which is guided by a raised portion 34 of the frame 27 over which the block 33 slides. The block 33 is provided with an upwardly projecting pivot pin 35 on which is pivoted a bracket 36 which carries a casing 37 which incloses the member 12 and disk 10. The bracket 36 has projecting arms 38 which carry friction shoes 39 adapted to be engaged by the friction disk 10 when the shaft 9 is rotated as previously described. By turning the screw shaft 29 the block 33 and therewith the bracket 36, casing 37 and shoes 39 may be adjusted to vary the degree of pressure of the disk 10 against the shoes 39 to regulate the speed of the shaft 9 and the motor driving it. By pivoting the bracket 36 on the block 33, as shown, the friction shoes 39 may adjust themselves automatically to bear with the same degree of pressure against the friction disk 10.

I claim:

1. The combination of a rotatable shaft, a collar on the shaft, means to prevent longitudinal movement of the collar on the shaft, a friction disk slidable on said shaft, weighted parts connecting the collar and the disk and adapted to move the latter longitudinally on the shaft, and a pivoted friction member embracing said shaft and provided with two projecting parts adapted to be engaged by said disk on the respective sides of the shaft and on the respective sides of the axis of the pivot of the member.

2. The combination of a rotatable shaft, a collar on the shaft, means to prevent longitudinal movement of the collar on the shaft, a friction member supported adjacent to the shaft, a friction disk slidable on said shaft toward and from said member and adapted to engage the same, weighted parts connecting the collar and the disk and adapted to move the latter longitudinally of the shaft, a driving member fixed on said shaft and having an opening therein, and a pin projecting from said disk and slidable within said opening, whereby the driving member causes the rotation of the disk with and permits it to be moved longitudinally of the shaft.

3. The combination of a rotatable shaft, a collar rotatably mounted on the shaft, means to prevent the collar from moving longitudinally of the shaft while permitting the collar to turn on the shaft, a friction member supported adjacent to the shaft, a friction disk slidable on said shaft toward and from said member and adapted to engage the same, weighted parts connecting the collar and the disk and adapted to move the latter longitudinally of the shaft, and means to cause the disk to turn with the shaft and to permit the disk to move longitudinally of the shaft.

4. The combination of a rotatable shaft, a collar rotatably mounted on the shaft, means to prevent the collar from moving longitudinally of the shaft and to permit the collar to turn on the shaft, a friction member supported adjacent to the shaft, a friction disk slidable on said shaft toward and from said member and adapted to engage the same, weighted parts connecting the collar and the disk and adapted to move the latter longitudinally of the shaft, a driving member fixed on said shaft and having an opening therein, and a pin projecting from said disk and slidable within said opening, whereby the driving member causes the rotation of the disk with and permits it to be moved longitudinally of the shaft.

5. The combination of supporting means, a shaft mounted to rotate in the supporting means, a friction disk carried by the shaft, means carried by the shaft and controlled by the speed thereof for moving the disk longitudinally of the shaft, a casing adjustably supported by the supporting means and inclosing the friction disk, and a friction member pivoted on the casing adjacent to and adapted to be engaged by the friction disk.

In testimony whereof I affix my signature hereto.

ROBERT F. COLEMAN.

Copies of this patent may be obtained for five cents each, by addressing the "Commissioner of Patents, Washington, D. C."